(12) United States Patent
Morimoto et al.

(10) Patent No.: US 12,054,836 B2
(45) Date of Patent: Aug. 6, 2024

(54) ENERGY CONVERSION SYSTEM

(71) Applicant: DENSO CORPORATION, Kariya (JP)

(72) Inventors: Youhei Morimoto, Kariya (JP);
Shigekazu Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 331 days.

(21) Appl. No.: 17/564,750

(22) Filed: Dec. 29, 2021

(65) Prior Publication Data
US 2022/0119964 A1   Apr. 21, 2022

Related U.S. Application Data

(63) Continuation of application No. PCT/JP2020/023432, filed on Jun. 15, 2020.

(30) Foreign Application Priority Data

Jul. 2, 2019   (JP) .................. 2019-123666

(51) Int. Cl.
*C25B 3/25* (2021.01)
*C10L 3/08* (2006.01)
(Continued)

(52) U.S. Cl.
CPC .................... *C25B 3/25* (2021.01);
*C10L 3/08* (2013.01); *C25B 3/03* (2021.01);
*C25B 3/26* (2021.01);
(Continued)

(58) Field of Classification Search
CPC .... C25B 3/25; C25B 3/26; C25B 3/03; C25B 15/08
See application file for complete search history.

(56) References Cited

U.S. PATENT DOCUMENTS 11,512,403 B2 * 11/2022 Kuhl ............... C25B 15/081
2018/0265440 A1   9/2018 Kudo et al.
(Continued)

FOREIGN PATENT DOCUMENTS

| EP | 3 460 104 A1 | 3/2019 |
| WO | 2012/166997 A2 | 12/2012 |
| WO | 2018/099709 A1 | 6/2018 |

OTHER PUBLICATIONS

Li Wenying et al., "Performance and methane production characteristics of H2O—CO2 co-electrolysis in solid oxide electrolysis cells," International Journal of Hydrogen Energy, Aug. 21, 2013, vol. 38, No. 25, pp. 11104-11109.

*Primary Examiner* — Nicholas A Smith
(74) *Attorney, Agent, or Firm* — Oliff PLC

(57) ABSTRACT

An energy conversion system includes a fuel synthesis device, an $H_2O$ supply unit, a $CO_2$ supply unit, and a supply control unit. The fuel synthesis device includes an electrolyte, and a pair of electrodes provided on both sides of the electrolyte. The $H_2O$ supply unit supplies $H_2O$ to the fuel synthesis device. The $CO_2$ supply unit supplies $CO_2$ to the fuel synthesis device. The supply control unit controls a supply of $H_2O$ and a supply of $CO_2$. The fuel synthesis device electrolyzes $H_2O$ and $CO_2$ using external electric power, and synthesizes a hydrocarbon using $H_2$ and CO generated by electrolysis. The supply control unit starts the supply of $H_2O$ to the fuel synthesis device by the $H_2O$ supply unit after the supply of $CO_2$ to the fuel synthesis device by the $CO_2$ supply unit is started.

9 Claims, 4 Drawing Sheets

(51) Int. Cl.
*C25B 3/03* (2021.01)
*C25B 3/26* (2021.01)
*C25B 15/029* (2021.01)
*C25B 15/08* (2006.01)
*H01M 8/0656* (2016.01)

(52) U.S. Cl.
CPC ............ *C25B 15/029* (2021.01); *C25B 15/08* (2013.01); *H01M 8/0656* (2013.01)

(56) References Cited

U.S. PATENT DOCUMENTS

| | | |
|---|---|---|
| 2019/0194816 A1* | 6/2019 | Brunot ........................ C25B 9/73 |
| 2020/0002821 A1* | 1/2020 | Ono ........................... C25B 9/05 |
| 2020/0223775 A1 | 7/2020 | Kudo et al. |

\* cited by examiner

ENERGY CONVERSION SYSTEM

CROSS-REFERENCE TO RELATED APPLICATION

The present application is a continuation application of International Application No. PCT/JP2020/023432 filed on Jun. 15, 2020, which is based on and claims the benefit of priority from Japanese Patent Application No. 2019-123666 filed with the Japan Patent Office on Jul. 2, 2019. The contents of these applications are incorporated herein by reference in their entirety.

BACKGROUND

The present disclosure relates to an energy conversion system.

A carbon dioxide electrolysis device including an anode that oxidizes water, a cathode that electrochemically reduces carbon dioxide to generate a product such as hydrocarbons has been known.

SUMMARY

An energy conversion system of the present disclosure includes a fuel synthesis device, an $H_2O$ supply unit, a $CO_2$ supply unit, and a supply control unit. The fuel synthesis device includes an electrolyte, and a pair of electrodes provided on both sides of the electrolyte. The $H_2O$ supply unit supplies $H_2O$ to the fuel synthesis device. The $CO_2$ supply unit supplies $CO_2$ to the fuel synthesis device. The supply control unit controls a supply of $H_2O$ by the $H_2O$ supply unit and a supply of $CO_2$ by the $CO_2$ supply unit.

DETAILED DESCRIPTION OF THE PREFERRED EMBODIMENTS

Figure 1:
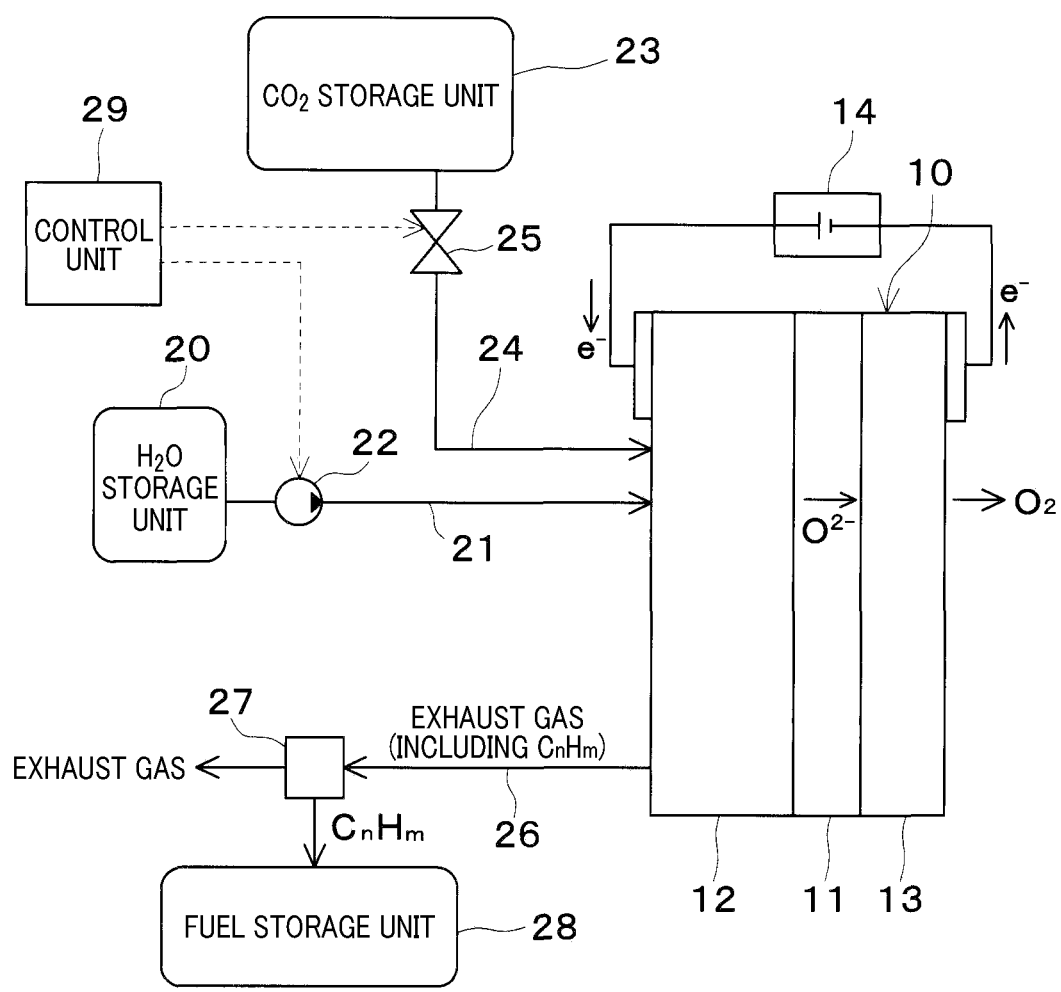
FIG. 1 is a diagram showing a configuration of an energy conversion system according to a first embodiment.

Hereinafter, embodiments for implementing the present disclosure will be described with reference to the drawings. In each embodiment, portions corresponding to the matters described in the preceding embodiments are denoted by the same reference signs, and redundant description may be omitted. When only part of the configuration is described in one embodiment, the configuration of another embodiment previously described may be applied to the other parts of the configuration. In addition to the combinations of the portions that are specifically and explicitly described in the embodiments as portions that can be combined, the embodiments may be partially combined even if it is not explicitly described that the embodiments can be combined, provided there is no problem caused by the combination.

The present disclosure relates to an energy conversion system.

JP 2018-150595 A proposes a carbon dioxide electrolysis device including an anode that oxidizes water, a cathode that electrochemically reduces carbon dioxide to generate a product such as hydrocarbons, and a cathode solution supply passage through which a cathode solution is supplied to the cathode. The device adjusts the amount of products by controlling a differential pressure between the pressure of the cathode solution and the pressure of the carbon dioxide.

However, when an electrolytic reaction in which carbon dioxide and water are electrolyzed to generate carbon monoxide and water and a synthesis reaction of a hydrocarbon using carbon monoxide and water are performed in the same portion of a system, a factor other than the pressure may inhibit the reactions, thus reducing the system efficiency.

In view of the above point, an object of the present disclosure is to improve the system efficiency of an energy conversion system in which an electrolytic reaction of carbon dioxide and water and a synthesis reaction of a hydrocarbon are performed in the same portion.

In order to achieve the above object, an energy conversion system of the present disclosure includes a fuel synthesis device, an $H_2O$ supply unit, a $CO_2$ supply unit, and a supply control unit. The fuel synthesis device includes an electrolyte, and a pair of electrodes provided on both sides of the electrolyte. The $H_2O$ supply unit supplies $H_2O$ to the fuel synthesis device. The $CO_2$ supply unit supplies $CO_2$ to the fuel synthesis device. The supply control unit controls a supply of $H_2O$ by the $H_2O$ supply unit and a supply of $CO_2$ by the $CO_2$ supply unit.

The fuel synthesis device electrolyzes $H_2O$ and $CO_2$ using externally-supplied electric power, and synthesizes a hydrocarbon using $H_2$ generated by electrolysis of $H_2O$ and CO generated by electrolysis of $CO_2$. The supply control unit starts the supply of $H_2O$ to the fuel synthesis device by the $H_2O$ supply unit after the supply of $CO_2$ to the fuel synthesis device by the $CO_2$ supply unit is started.

Thus, the CO concentration is high when the supply of $H_2O$ is started. Accordingly, in an electrolytic reaction, the chemical equilibrium of a reverse water-gas shift reaction is shifted toward the side on which CO is lost, and a reverse water-gas shift reaction is less likely to occur. This makes it possible to reduce the consumption of $H_2$ by the reverse water-gas shift reaction and reduce the consumption of electric power used to generate $H_2$, thus improving the system efficiency.

Since the supply of $H_2O$ is started after the supply of $CO_2$ is started, the amount of $CO_2$ is small when a fuel synthesis reaction is started. Thus, of hydrocarbon synthesis reactions, a Sabatier reaction using $CO_2$ is less likely to occur. This reduces the amount of $H_2O$ generated as a byproduct by hydrocarbon synthesis; thus, the chemical equilibrium of the hydrocarbon synthesis reaction is shifted toward the side on which a hydrocarbon is generated, increasing the hydrocarbon generation rate. Furthermore, since the Sabatier reaction is less likely to occur, it is possible to reduce the consumption of $H_2$ and reduce the consumption of electric power used to generate $H_2$.

First Embodiment

An energy conversion system according to a first embodiment of the present disclosure will be described below with reference to the drawings.

As shown in FIG. 1, the energy conversion system includes a fuel synthesis device 10. The fuel synthesis device 10 is a solid oxide electrolysis cell (SOEC), and can electrolyze water and carbon dioxide.

The fuel synthesis device 10 includes an electrolyte 11, and a pair of electrodes 12 and 13 that are provided on both sides of the electrolyte 11. The fuel synthesis device 10 shown in FIG. 1 is a single cell in which the electrolyte 11 is sandwiched between the pair of electrodes 12 and 13, but the fuel synthesis device 10 may have a stack structure in which a plurality of cells are stacked.

The electrolyte 11 is a solid material having oxygen ion conductivity, and may be, for example, $ZrO_2$, which is zirconium oxide. The electrodes 12 and 13 are configured as cermets obtained by mixing a metal catalyst with ceramic and firing the mixture. The first electrode 12 is provided with Ni, Co, and the like as metal catalysts. Ni and Co are catalysts that promote an electrolytic reaction of $CO_2$ and $H_2$ and a synthesis reaction of a hydrocarbon. The second electrode 13 is provided with Ni, Pt, and the like as metal catalysts. Ni and Pt are catalysts that promote a reaction in which $O^{2-}$ is combined with electrons to generate $O_2$. The first electrode 12 is a cathode, and the second electrode 13 is an anode.

Electric power is supplied to the fuel synthesis device 10 from a power supply device 14 which is an external power source. In the present embodiment, the power supply device 14 is a power generation device that uses natural energy. The power supply device 14 may be, for example, a solar power generation device.

$H_2O$ and $CO_2$ are supplied to the first electrode 12 while electric power is supplied to the fuel synthesis device 10.

$H_2O$ is supplied from an $H_2O$ storage unit 20 to the first electrode 12 through an $H_2O$ supply passage 21. The $H_2O$ storage unit 20 of the present embodiment stores $H_2O$ in a liquid state. The $H_2O$ supply passage 21 is provided with an $H_2O$ pump 22 that pressure-feeds $H_2O$. $H_2O$ may be supplied in a liquid state to the first electrode 12, or $H_2O$ may be supplied as water vapor to the first electrode 12. The $H_2O$ pump 22 operates based on a control signal from a control unit 29 (described later). The $H_2O$ storage unit 20 and the $H_2O$ pump 22 correspond to an $H_2O$ supply unit.

$CO_2$ is supplied from a $CO_2$ storage unit 23 to the fuel synthesis device 10 through a $CO_2$ supply passage 24. The $CO_2$ storage unit 23 of the present embodiment stores $CO_2$ in a liquid state. $CO_2$ stored in the $CO_2$ storage unit 23 is pressurized.

The $CO_2$ supply passage 24 is provided with a pressure control valve 25. The pressure control valve 25 reduces the pressure of $CO_2$ stored in the $CO_2$ storage unit 23. The pressure control valve 25 is an expansion valve for expanding $CO_2$. The pressure control valve 25 operates based on a control signal from the control unit 29 (described later). The $CO_2$ storage unit 23 and the pressure control valve 25 correspond to a $CO_2$ supply unit.

In the first electrode 12 of the fuel synthesis device 10, $H_2$ is generated by electrolysis of $H_2O$, and CO is generated by electrolysis of $CO_2$. In the first electrode 12, a hydrocarbon is synthesized from $H_2$ and CO generated by electrolysis. The synthesized hydrocarbon is contained in a fuel synthesis exhaust gas and discharged from the first electrode 12. The hydrocarbon contained in the fuel synthesis exhaust gas may be, for example, methane. The hydrocarbon may be a fuel, and can be used, for example, for power generation by a fuel cell.

The fuel synthesis exhaust gas passes through a fuel synthesis exhaust gas passage 26. The fuel synthesis exhaust gas passage 26 is provided with a fuel separation unit 27. The fuel separation unit 27 separates the hydrocarbon from the fuel synthesis exhaust gas. The hydrocarbon may be separated from the fuel synthesis exhaust gas, for example, by distillation.

The hydrocarbon separated by the fuel separation unit 27 is stored as a fuel in a fuel storage unit 28. The fuel storage unit 28 of the present embodiment stores a hydrocarbon in a liquid state.

The energy conversion system includes the control unit 29. The control unit 29 is configured by a known microcomputer including a CPU, a ROM, a RAM, and the like, and its peripheral circuitry. The control unit 29 performs various arithmetic operations and processes based on an air conditioning control program stored in the ROM, and controls the operation of various devices to be controlled such as the $H_2O$ pump 22 and the pressure control valve 25. An input side of the control unit 29 is connected to various sensors and the like (not shown).

The control unit 29 controls the $H_2O$ pump 22 to control the timing at which $H_2O$ is supplied to the first electrode 12 and the amount of $H_2O$ supplied to the first electrode 12. The control unit 29 controls the pressure control valve 25 to control the timing at which $CO_2$ is supplied to the first electrode 12 and the amount of $CO_2$ supplied to the first electrode 12. The control unit 29 corresponds to a supply control unit.

Figure 2:
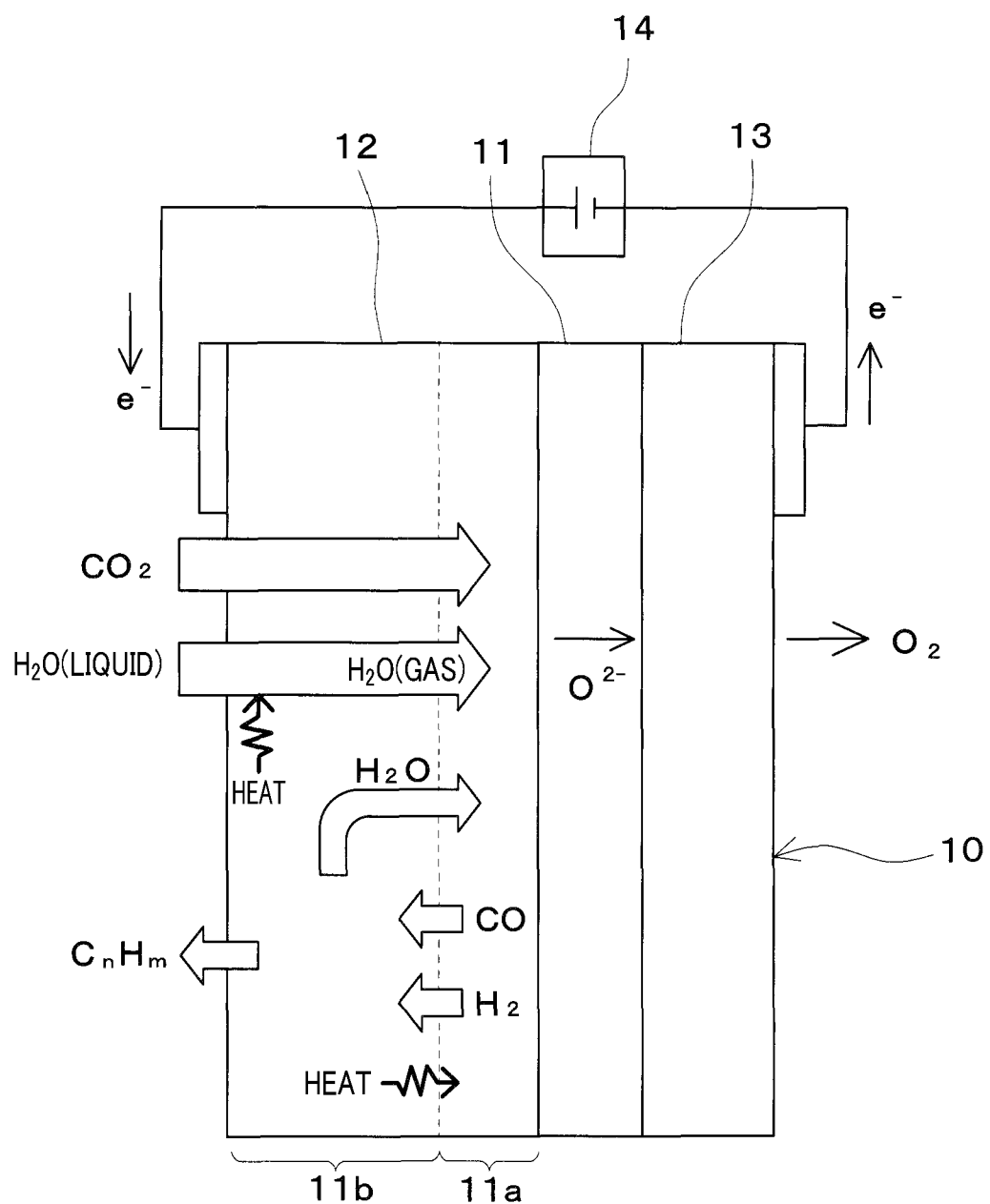
FIG. 2 is a diagram showing flows of substances in a fuel synthesis device.

Next, chemical reactions that occur in the fuel synthesis device 10 will be described with reference to FIG. 2. In the fuel synthesis device 10, when $H_2O$ and $CO_2$ are supplied to the first electrode 12 while electric power is supplied from the power supply device 14 to the fuel synthesis device 10, an electrolytic reaction of $H_2O$ and $CO_2$ occurs in the first electrode 12 to generate $H_2$, CO, and $O^{2-}$. $O^{2-}$ generated in the first electrode 12 migrates to the second electrode 13 through the electrolyte 11. In the second electrode 13, $O^{2-}$ is combined with electrons to generate $O_2$.

In the first electrode 12, a fuel synthesis reaction occurs in which $CH_4$ is synthesized from $H_2$ and CO generated by the electrolytic reaction. $CH_4$ generated in the first electrode 12 is discharged as a fuel synthesis exhaust gas from the fuel synthesis device 10 through the fuel synthesis exhaust gas passage 26. $CH_4$ contained in the fuel synthesis exhaust gas is separated by the fuel separation unit 27, and is stored as a hydrocarbon fuel in the fuel storage unit 28. The remaining fuel synthesis exhaust gas obtained by separating $CH_4$ is discharged externally.

The electrolytic reaction mainly occurs on the side of the first electrode 12 closer to the electrolyte 11. The fuel synthesis reaction mainly occurs on the side of the first electrode 12 farther from the electrolyte 11. The electrolytic reaction is an endothermic reaction, and the fuel synthesis reaction is an exothermic reaction. Thus, the first electrode 12 has an endothermic region 11a on the side closer to the electrolyte 11 and an exothermic region 11b on the side farther from the electrolyte 11.

The heat generated by the fuel synthesis reaction in the exothermic region 11b is transmitted to the endothermic region 11a in which the electrolytic reaction occurs. Furthermore, the heat generated by the fuel synthesis reaction in the exothermic region 11b is used to heat $H_2O$ in a liquid state supplied to the first electrode 12.

In the first electrode 12 of the fuel synthesis device 10, the following electrolytic reactions and fuel synthesis reactions occur.

[First Electrolytic Reaction (Co-Electrolytic Reaction)]

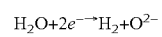

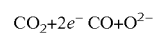

[Second Electrolytic Reaction (Reverse Water-Gas Shift Reaction)]

$$CO_2 + H_2 \rightarrow CO + H_2O$$

[First Fuel Synthesis Reaction (Methanation Reaction)]

$$3H_2 + CO \rightarrow CH_4 + H_2O$$

[Second Fuel Synthesis Reaction (Sabatier Reaction)]

$$4H_2 + CO_2 \rightarrow CH_4 + 2H_2O$$

In the second electrolytic reaction, $H_2$ generated by the first electrolytic reaction is consumed to generate $H_2O$. If the ratio of the second electrolytic reaction of the two types of electrolytic reactions is increased, a larger amount of electric power is required to generate $H_2$, thus reducing the system efficiency. Therefore, it is preferable to minimize the occurrence of the second electrolytic reaction of the two types of electrolytic reactions.

In the fuel synthesis reaction, with the synthesis of $CH_4$, $H_2O$ is generated as a byproduct. This $H_2O$ is also used to generate $H_2$ in the first electrolytic reaction.

The amount of $H_2O$ generated by the second fuel synthesis reaction is twice the amount of $H_2O$ generated by the first fuel synthesis reaction. When a large amount of $H_2O$ is present, the chemical equilibrium of the first fuel synthesis reaction is shifted toward the side on which methane is lost, reducing the methane generation rate. Furthermore, the second fuel synthesis reaction consumes a larger amount of $H_2$ during the fuel synthesis than the first fuel synthesis reaction. Accordingly, the second fuel synthesis reaction requires a larger amount of electric power to generate $H_2$ than the first fuel synthesis reaction, thus reducing the system efficiency. Therefore, it is preferable to minimize the occurrence of the second fuel synthesis reaction of the two types of fuel synthesis reactions.

Figure 3:
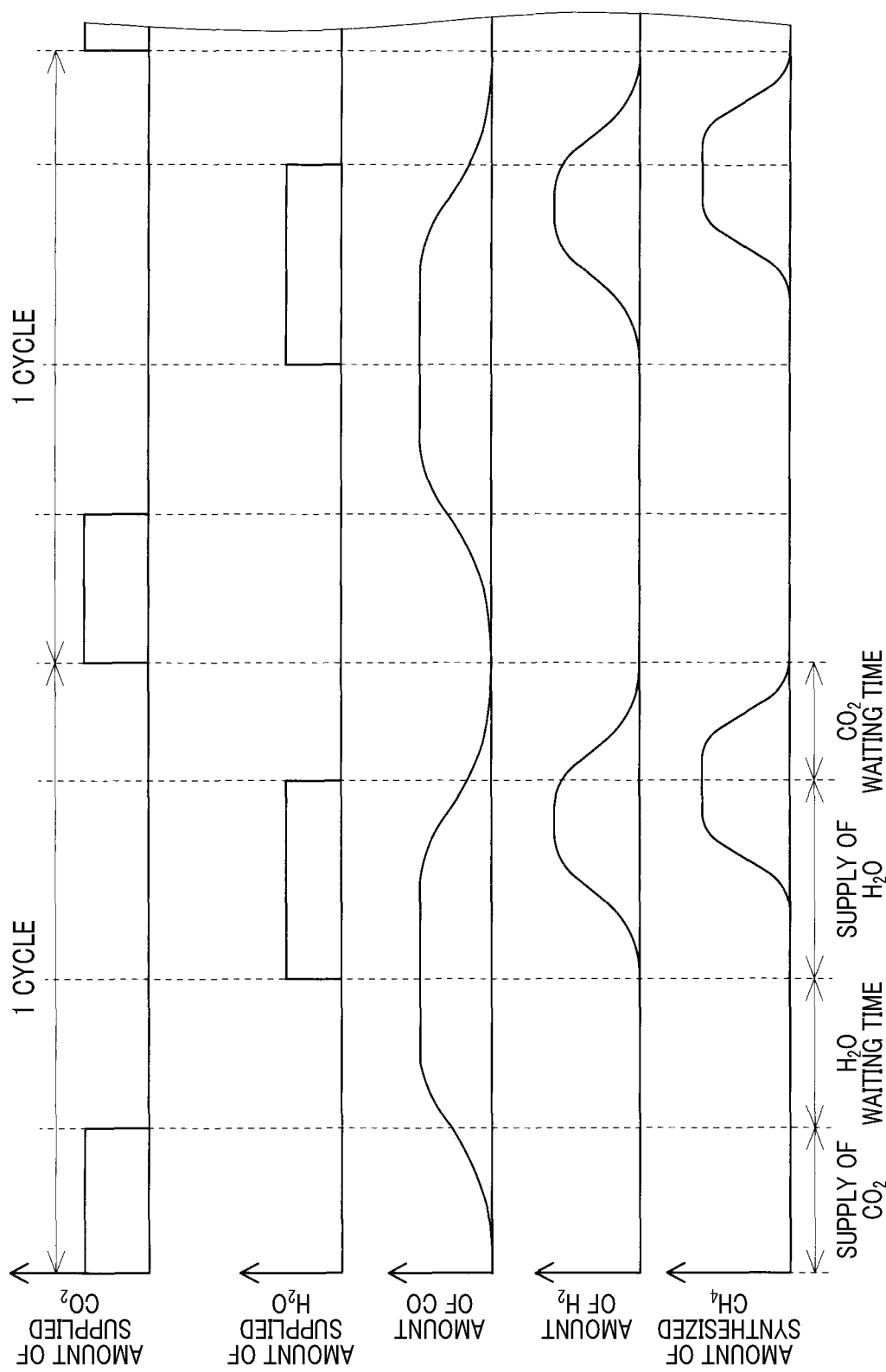
FIG. 3 is a diagram showing a relationship of the amount of supplied $CO_2$, the amount of supplied $H_2O$, the amount of generated CO, the amount of generated $H_2$, and the amount of synthesized $CH_4$ in the fuel synthesis device.

Next, the control of the supply of $CO_2$ and $H_2O$ in the energy conversion system of the present embodiment will be described with reference to FIG. 3. In the energy conversion system of the present embodiment, $CO_2$ and $H_2O$ are supplied at different timings to the first electrode 12 of the fuel synthesis device 10. In the present embodiment, after the supply of $CO_2$ to the first electrode 12 is started, the supply of $H_2O$ to the first electrode 12 is started.

The supply of $CO_2$ to the first electrode 12 and the supply of $H_2O$ to the first electrode 12 are alternately performed, and a period during which $CO_2$ is supplied to the first electrode 12 does not overlap with a period during which $H_2O$ is supplied to the first electrode 12. A single cycle is a period from a supply of $CO_2$ to the first electrode 12 to the next supply of $CO_2$ to the first electrode 12.

First, when the supply of $CO_2$ to the first electrode 12 is started, the electrolysis of $CO_2$ is started to generate CO. The amount of CO starts to increase a little later than the start of the supply of $CO_2$.

The supply of $H_2O$ to the first electrode 12 is started when a predetermined $H_2O$ waiting time has elapsed after the supply of $CO_2$ to the first electrode 12 is ended. The "$H_2O$ waiting time" is set as a time required for 90% or more of $CO_2$ supplied to the first electrode 12 to be converted into CO. The "$H_2O$ waiting time" can be set by experimentally obtaining in advance the time required for 90% or more of $CO_2$ supplied to the first electrode 12 to be converted into CO.

Since the supply of $H_2O$ to the first electrode 12 is started when the $H_2O$ waiting time has elapsed after the supply of $CO_2$ to the first electrode 12 is ended, the CO concentration is sufficiently high at the time when the supply of $H_2O$ to the first electrode 12 is started.

When the supply of $H_2O$ to the first electrode 12 is started, the electrolysis of $H_2O$ is started to generate $H_2$. The amount of $H_2$ starts to increase a little later than the start of the supply of $H_2O$. In the first electrode 12, since CO and $H_2$ are present, $CH_4$ is synthesized. When the synthesis of $CH_4$ proceeds, the amount of CO and the amount of $H_2$ are reduced.

The supply of $CO_2$ to the first electrode 12 is started when a predetermined $CO_2$ waiting time has elapsed after the supply of $H_2O$ to the first electrode 12 is ended. The "$CO_2$ waiting time" is set as a time required for 90% or more of $H_2$ generated by electrolysis of $H_2O$ to be converted into $CH_4$. The "$CO_2$ waiting time" can be set in advance by experimentally obtaining the time required for 90% or more of $H_2$ generated by electrolysis of $H_2O$ to be converted into $CH_4$.

In the present embodiment, the molar ratio of the amount of $H_2O$ supplied to the first electrode 12 to the amount of $CO_2$ supplied to the first electrode 12 is set in the range of 2 to 3. This point will be described below.

In the first fuel synthesis reaction described above, the number of moles of $H_2$ required is three times the number of moles of CO required. That is, in the first electrolytic reaction, the number of moles of $H_2O$ required to generate $H_2$ is three times the number of moles of $CO_2$ required to generate CO.

In the first electrolytic reaction, $H_2O$ generated by the first fuel synthesis reaction is also electrolyzed. Thus, the amount of $H_2O$ supplied from the $H_2O$ storage unit 20 to the first electrode 12 needs to be the amount obtained by subtracting the amount of $H_2O$ generated by the first fuel synthesis reaction from the amount of $H_2O$ required for the first electrolytic reaction. Therefore, the molar ratio of the amount of $H_2O$ supplied to the first electrode 12 to the amount of $CO_2$ supplied to the first electrode 12 is preferably 2 or more.

If an excessive amount of $H_2O$ is supplied to the first electrode 12, the second fuel synthesis reaction is more likely to occur. Therefore, the molar ratio of the amount of $H_2O$ supplied to the first electrode 12 to the amount of $CO_2$ supplied to the first electrode 12 is preferably 3 or less.

In the energy conversion system of the present embodiment described above, since the supply of $H_2O$ to the first electrode 12 is started after the supply of $CO_2$ to the first electrode 12 is started, the CO concentration is high when the supply of $H_2O$ to the first electrode 12 is started. Thus, the chemical equilibrium of the second electrolytic reaction (reverse water-gas shift reaction) is shifted toward the side on which CO is lost, and the second electrolytic reaction is less likely to occur. This makes it possible to reduce the consumption of $H_2$ by the second electrolytic reaction and reduce the consumption of electric power used to generate $H_2$, thus improving the system efficiency.

Since the supply of $H_2O$ to the first electrode 12 is started after the supply of $CO_2$ to the first electrode 12 is started, the amount of $CO_2$ in the first electrode 12 is small when the fuel synthesis reaction is started. Thus, the second fuel synthesis reaction (Sabatier reaction) using $CO_2$ for the synthesis of $CH_4$ is less likely to occur. This reduces the amount of $H_2O$ generated as a byproduct by fuel synthesis; thus, the chemical equilibrium of the first fuel synthesis reaction is shifted toward the side on which methane is synthesized, increasing the methane generation rate. Furthermore, since the second fuel synthesis reaction is less likely to occur, it is possible to reduce the consumption of $H_2$ by the second fuel synthesis reaction and reduce the consumption of electric power used to generate $H_2$. As a result, system efficiency is improved.

In the present embodiment, the supply of $H_2O$ to the first electrode 12 is started when the predetermined $H_2O$ waiting time has elapsed after the supply of $CO_2$ to the first electrode 12 is ended. Thus, $H_2O$ is supplied to the first electrode 12 after most of $CO_2$ supplied to the first electrode 12 is converted into CO. This makes it possible to effectively reduce the occurrence of the second electrolytic reaction and the second fuel synthesis reaction.

In the present embodiment, the supply of $CO_2$ to the first electrode 12 is started when the predetermined $CO_2$ waiting time has elapsed after the supply of $H_2O$ to the first electrode 12 is ended. Accordingly, $CO_2$ is supplied to the first electrode 12 after most of $H_2$ generated in the first electrode 12 is used for the synthesis of $CH_4$; thus, the $H_2$ concentration is low when the supply of $CO_2$ to the first electrode 12 is started. As a result, the second electrolytic reaction is less likely to occur, and this makes it possible to reduce the consumption of $H_2$ by the second electrolytic reaction and reduce the consumption of electric power used to generate $H_2$.

In the present embodiment, the molar ratio of the amount of $H_2O$ supplied to the first electrode 12 to the amount of $CO_2$ supplied to the first electrode 12 is set in the range of 2 to 3. By setting the molar ratio of the amount of $H_2O$ supplied to the first electrode 12 to the amount of $CO_2$ supplied to the first electrode 12 to 2 or greater, it is possible to secure the amount of $H_2$ required for the first fuel synthesis reaction. By setting the molar ratio of the amount of $H_2O$ supplied to the first electrode 12 to the amount of $CO_2$ supplied to the first electrode 12 to 3 or less, it is possible to suppress the second fuel synthesis reaction.

Second Embodiment

Next, a second embodiment of the present disclosure will be described. In the second embodiment, only portions different from the first embodiment will be described.

Figure 4:
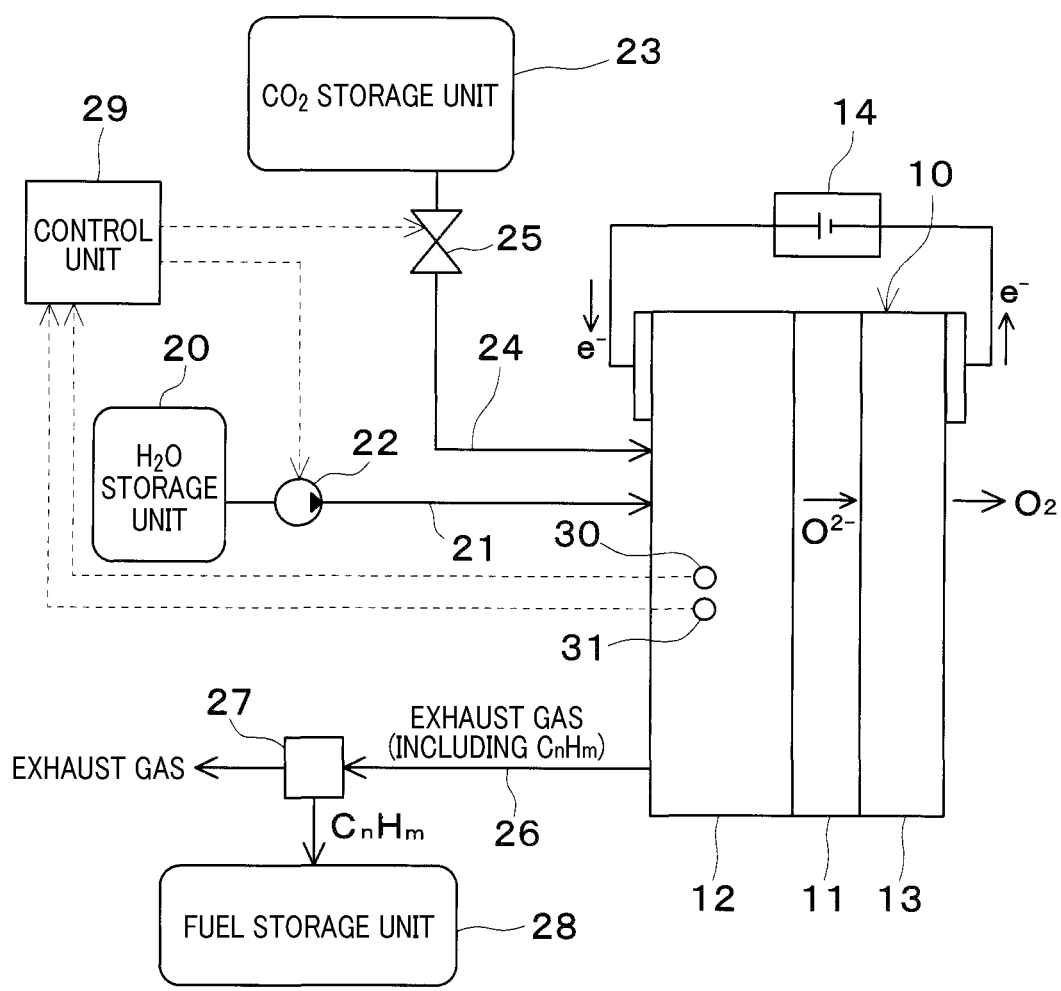
FIG. 4 is a diagram showing a configuration of an energy conversion system according to a second embodiment.

As shown in FIG. 4, in the second embodiment, the energy conversion system includes a $CO_2$ sensor 30 that detects the $CO_2$ concentration in the first electrode 12 and an $H_2$ sensor 31 that detects the $H_2$ concentration in the first electrode 12. A sensor output value from the $CO_2$ sensor 30 and a sensor output value from the $H_2$ sensor 31 are inputted to the control unit 29.

The supply of $H_2O$ to the first electrode 12 is started according to the $CO_2$ concentration in the first electrode 12 detected by the $CO_2$ sensor 30. The supply of $CO_2$ to the first electrode 12 is started according to the $H_2$ concentration in the first electrode 12 detected by the $H_2$ sensor 31.

In the second embodiment, the supply of $H_2O$ to the first electrode 12 is started when, after the supply of $CO_2$ to the first electrode 12 is ended, the $CO_2$ concentration detected by the $CO_2$ sensor 30 becomes 10% or less of the $CO_2$ concentration when the supply of $CO_2$ is ended.

In the second embodiment, the supply of $CO_2$ to the first electrode 12 is started when, after the supply of $H_2O$ to the first electrode 12 is ended, the $H_2$ concentration detected by the $H_2$ sensor 31 becomes 10% or less of the $H_2$ concentration when the supply of $H_2O$ is ended.

In the second embodiment described above, the supply of $H_2O$ to the first electrode 12 is started according to the $CO_2$ concentration in the first electrode 12 detected by the $CO_2$ sensor 30. This makes it possible to start the supply of $H_2O$ to the first electrode 12 at an appropriate timing.

In the second embodiment, the supply of $CO_2$ to the first electrode 12 is started according to the $H_2$ concentration in the first electrode 12 detected by the $H_2$ sensor 31. This makes it possible to start the supply of $CO_2$ to the first electrode 12 at an appropriate timing.

The present disclosure is not limited to the embodiments described above, and can be variously modified as follows without departing from the gist of the present disclosure. Furthermore, the means disclosed in the above embodiments may be appropriately combined in a feasible range.

For example, in the embodiments, methane is described as an example of the hydrocarbon synthesized by the fuel synthesis device 10, but a different type of hydrocarbon may be synthesized. The type of hydrocarbon to be synthesized can be varied by varying the type and reaction temperature of the catalyst used for the first electrode 12. Examples of different types of hydrocarbons include hydrocarbons such as ethane and propane that have a larger number of carbon atoms than methane, and hydrocarbons such as alcohol and ether that contain an oxygen atom.

In the embodiments, $CO_2$ in a liquid state is stored in the $CO_2$ storage unit 23, but $CO_2$ in a gas state may be included as long as at least part of the recovered $CO_2$ is stored in a liquid state.

In the embodiments, a hydrocarbon in a liquid state is stored in the fuel storage unit 28, but a hydrocarbon in a gas state may be stored in the fuel storage unit 28.

In the configuration of the embodiments, the heat generated during the operation of the fuel synthesis device 10 may be used to supply hot water, or the like.

The present disclosure has been described in accordance with the embodiments; however, it is understood that the present disclosure is not limited to the embodiments and structures. The present disclosure includes various modifications and modifications within the equivalent range. In addition, although various combinations and forms are shown in the present disclosure, other combinations and forms including only one element, more or less, are within the scope and spirit of the present disclosure.

What is claimed is:

1. An energy conversion system comprising:
   a fuel synthesis device that includes an electrolyte, and a pair of electrodes provided on both sides of the electrolyte;
   an $H_2O$ supply unit that supplies $H_2O$ to the fuel synthesis device;
   a $CO_2$ supply unit that supplies $CO_2$ to the fuel synthesis device; and
   a supply control unit that controls a supply of $H_2O$ by the $H_2O$ supply unit and a supply of $CO_2$ by the $CO_2$ supply unit, wherein
   the fuel synthesis device electrolyzes $H_2O$ and $CO_2$ using externally-supplied electric power, and synthesizes a hydrocarbon using $H_2$ and CO generated by electrolysis, and
   the supply control unit starts the supply of $H_2O$ to the fuel synthesis device by the $H_2O$ supply unit after the supply of $CO_2$ to the fuel synthesis device by the $CO_2$ supply unit is started.

2. The energy conversion system according to claim 1, wherein the supply control unit sets a molar ratio of an amount of $H_2O$ supplied to the fuel synthesis device to an amount of $CO_2$ supplied to the fuel synthesis device in a range of 2 to 3.

3. The energy conversion system according to claim 1, wherein the supply control unit starts the supply of $H_2O$ to the fuel synthesis device by the $H_2O$ supply unit after the supply of $CO_2$ to the fuel synthesis device by the $CO_2$ supply unit is ended.

4. The energy conversion system according to claim 3, wherein the supply control unit starts the supply of $H_2O$ to the fuel synthesis device by the $H_2O$ supply unit when a necessary time has elapsed after the supply of $CO_2$ to the fuel synthesis device by the $CO_2$ supply unit is ended, the necessary time being a time required for 90% or more of $CO_2$ supplied to the fuel synthesis device by the $CO_2$ supply unit to be converted into CO.

5. The energy conversion system according to claim 3, comprising a $CO_2$ sensor that detects a $CO_2$ concentration in the fuel synthesis device, wherein
the supply control unit starts the supply of $H_2O$ to the fuel synthesis device by the $H_2O$ supply unit when, after the supply of $CO_2$ to the fuel synthesis device by the $CO_2$ supply unit is ended, the $CO_2$ concentration detected by the $CO_2$ sensor becomes 10% or less of the $CO_2$ concentration when the supply of $CO_2$ to the fuel synthesis device by the $CO_2$ supply unit is ended.

6. The energy conversion system according to claim 1, wherein the supply control unit starts the supply of $CO_2$ to the fuel synthesis device by the $CO_2$ supply unit after the supply of $H_2O$ to the fuel synthesis device by the $H_2O$ supply unit is ended.

7. The energy conversion system according to claim 6, wherein the supply control unit starts the supply of $CO_2$ to the fuel synthesis device by the $CO_2$ supply unit when a necessary time has elapsed after the supply of $H_2O$ to the fuel synthesis device by the $H_2O$ supply unit is ended, the necessary time being a time required for 90% or more of $H_2$ generated by electrolysis of $H_2O$ to be converted into $CH_4$.

8. The energy conversion system according to claim 6, comprising an $H_2$ sensor that detects an $H_2$ concentration in the fuel synthesis device, wherein
the supply control unit starts the supply of $CO_2$ to the fuel synthesis device by the $CO_2$ supply unit when, after the supply of $H_2O$ to the fuel synthesis device by the $H_2O$ supply unit is ended, the $H_2$ concentration detected by the $H_2$ sensor becomes 10% or less of the $H_2$ concentration when the supply of $H_2O$ to the fuel synthesis device by the $H_2O$ supply unit is ended.

9. The energy conversion system according to claim 1, wherein the supply control unit alternately performs the supply of $CO_2$ to the fuel synthesis device by the $CO_2$ supply unit and the supply of $H_2O$ to the fuel synthesis device by the $H_2O$ supply unit.

\* \* \* \* \*